United States Patent
Heath et al.

(10) Patent No.: US 11,134,389 B2
(45) Date of Patent: Sep. 28, 2021

(54) ASSIGNING FREQUENCIES WITHOUT COORDINATION IN A SHARED SPECTRUM REGIME

(71) Applicant: Google LLC, Mountain View, CA (US)

(72) Inventors: Taliver Heath, Mountain View, CA (US); Mathew Varghese, Mountain View, CA (US); Yi Hsuan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 213 days.

(21) Appl. No.: 16/551,986

(22) Filed: Aug. 27, 2019

(65) Prior Publication Data

US 2021/0067975 A1 Mar. 4, 2021

(51) Int. Cl.
*H04W 16/14* (2009.01)
*H04W 4/029* (2018.01)

(52) U.S. Cl.
CPC ........... *H04W 16/14* (2013.01); *H04W 4/029* (2018.02)

(58) Field of Classification Search
CPC .............................. H04W 16/14; H04W 4/029
See application file for complete search history.

(56) References Cited

U.S. PATENT DOCUMENTS

| | | | |
|---|---|---|---|
| 9,888,389 B2 | 2/2018 | Bendlin et al. | |
| 2007/0032254 A1 | 2/2007 | Chen | |
| 2007/0165695 A1 | 7/2007 | Gerhardt et al. | |
| 2010/0091818 A1* | 4/2010 | Sen ........................ | H04B 1/715 375/136 |
| 2010/0238902 A1 | 9/2010 | Ji et al. | |
| 2011/0300891 A1 | 12/2011 | Deb et al. | |
| 2012/0165059 A1 | 6/2012 | Schmidt et al. | |
| 2013/0115984 A1 | 5/2013 | Schmidt et al. | |
| 2017/0094672 A1 | 3/2017 | Yerramalli et al. | |
| 2018/0338326 A1 | 11/2018 | Sadek et al. | |

OTHER PUBLICATIONS

International Search Report and Written Opinion for International Application No. PCT/US2020/047973 dated Nov. 20, 2020. 17 pages.

* cited by examiner

*Primary Examiner* — Siming Liu
(74) *Attorney, Agent, or Firm* — Lerner, David, Littenberg, Krumholz & Mentlik, LLP (57) ABSTRACT

Aspects of the disclosure relate to a non-coordinated shared spectrum system. One or more processors are configured receive data associated with a notification from a device experiencing interference on an assigned channel. The one or more processors may determine a coverage area of an antenna providing the assigned channel to the device and determine based on the data associated with the notification, available channels within the coverage area of the antenna. The one or more processors may generate a map based on the data associated with the notification, wherein the map indicates the available channels within the coverage area of the antenna.

20 Claims, 9 Drawing Sheets

ASSIGNING FREQUENCIES WITHOUT COORDINATION IN A SHARED SPECTRUM REGIME

BACKGROUND

Wireless communication systems are typically configured to operate within a particular frequency band. To minimize interference between devices of the wireless communication system using the same frequency band, the devices may be coordinated such that they do not use the same channel of a frequency band at the same time. Coordination of the devices may include assigning each device to a different channel or preventing multiple devices from using the same channel concurrently. However, when a frequency band is shared amongst multiple entities, the entities may not be made aware of which channels are assigned to the devices of other entities. As a result, devices belonging to different entities may be assigned the same channel, which may increase the risk of interference.

In such instances where coordination of the devices is not practical or possible, protocols which minimize the risk of interference, such as the Wi-Fi protocol "listen before talk", may be used by a device to minimize the risk of transmitting information on a channel already in use. In this regard, the device may listen for other communication on a channel and if no other communication is detected, the device may use the channel for communication. However, these interference minimizing protocols are not available on all devices.

BRIEF SUMMARY

One aspect of the disclosure provides a method for use in a non-coordinated shared spectrum system including receiving, by one or more processors, data associated with a notification from a device experiencing interference on an assigned channel. The method further includes determining a coverage area of an antenna providing the assigned channel to the device, determining, based on the data associated with the notification, available channels within the coverage area of the antenna, and generating a map based on the data associated with the notification, wherein the map indicates the available channels within the coverage area of the antenna. The interference may be caused by another device communicating on the assigned channel with another antenna.

The notification may include a request for a new channel assignment. The method may further include assigning one of the available channels to the device in response to the request.

The data associated with the notification may include one or more of the channel, a time at which the interference occurred, a location of the device at the time at which the interference occurred, a signal strength of the interference, a location of the antenna, or a type of the device. The method may further include determining the coverage area of another antenna by defining an area around the other antenna based on the location of the device at the time at which the interference occurred and a set of other locations of devices, wherein the other locations are locations of the devices at the time the other devices experienced interference. Determining the available channels may include determining a set of possible channels available at the antenna, determining all unavailable channels in the set of possible channels, and removing the unavailable channels from the set of possible channels. The unavailable channels may be one or more channels on which the device or another device experienced interference.

The maps may provide a visual representation of antenna locations corresponding to the antenna and at least one other antenna, and the available channels at each of the antennas. The map may further provide a visual representation of coverage areas at the antenna and the at least one other antenna. The map may include a collection of data which lists antenna locations corresponding to the antenna and at least one other antenna, and the available channels at each of the antennas.

Another aspect of the disclosure provides a system. The system includes one or more processors, and the one or more processors may be configured to receive data associated with a notification from a device experiencing interference on an assigned channel, determine a coverage area of an antenna providing the assigned channel to the device, determine based on the data associated with the notification, available channels within the coverage area of the antenna, and generate a map based on the data associated with the notification, wherein the map indicates the available channels within the coverage area of the antenna.

Another aspect of the disclosure provides a non-transitory computer-readable medium storing instructions, which when executed by one or more processors, cause the one or more processors to receive data associated with a notification from a device experiencing interference on an assigned channel, determine a coverage area of an antenna providing the assigned channel to the device, determine based on the data associated with the notification, available channels within the coverage area of the antenna, and generate a map based on the data associated with the notification, wherein the map indicates the available channels within the coverage area of the antenna.

DETAILED DESCRIPTION

Overview

Figure 1:
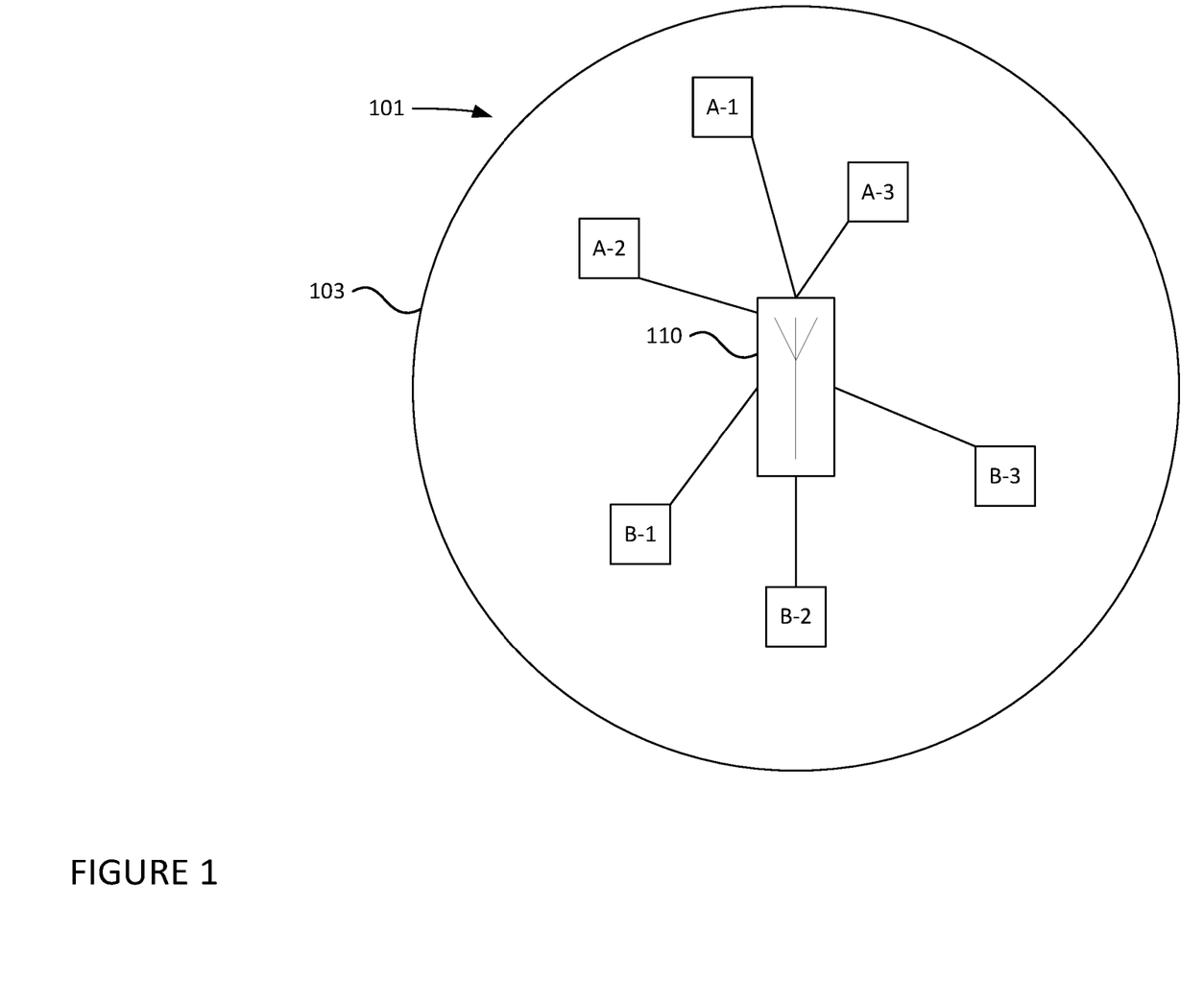
FIG. 1 shows a non-coordinated shared spectrum system in accordance with aspects of the disclosure.

To address situations where coordination of devices is not practical or possible, and/or situations where interference minimizing protocols are unavailable, such as in a non-coordinated shared spectrum system, the interference can be used to determine available channels. FIG. 1 illustrates an example non-coordinated shared spectrum system 101 having an antenna 110 with an area of coverage 103. An entity 'G' 282, through an entity computing device, such as entity computing device 202 shown in FIG. 2, may instruct the antenna 110 to randomly assign channels in a frequency band to a group of devices A1-A3 associated with entity 'G' 282. Each of the devices A1-A3 may communicate with the antenna 110 on the respective channel they are assigned. Another entity 'H' 283, through an entity computing device, such as entity computing device 203 shown in FIG. 2, may instruct the antenna 110 to assign channels in the frequency band to devices B1-B3 associated with entity 'H' 283. Each of the devices B1-B3 may communicate with the antenna 110 on the respective channel they are assigned. One of the devices associated with entity 'H' 283, such as device B1, may have the same channel assigned as a device of entity 'G' 282, such as device A1. When device A1 attempts to communicate with the antenna 110, interference created by device B1 may be detected by device A1. In response, device A1 may send a notification to the antenna 110 that device A1 is subject to interference. The notification may be a signal, message, or any other form of communication. In some instances, the notification may be, or otherwise include, a request for assignment of a new channel. The notification may imply that the channel currently assigned to device A1 is subject to interference from devices associated with other entities.

The data associated with the notification may be cataloged in a database. The data may be sourced from the notification, from the user device which provided the notification, and/or from the antenna or other systems which received or otherwise processed the notification. The data may include the channel on which the interference occurred, the location of the antenna in communication with the device, the location of the device where it experienced interference, etc., as further described herein. As similar data is generated and cataloged, including data from additional antenna locations, a map of the antennas with their unavailable channels can be generated. In addition, channels which have been successfully used by devices associated with entity 'G' can be stored in the map. The assignment of channels to the devices in the network operated by entity 'G' can then be performed based on the known available and unavailable channels as found in the map.

Example Systems

Figure 2:
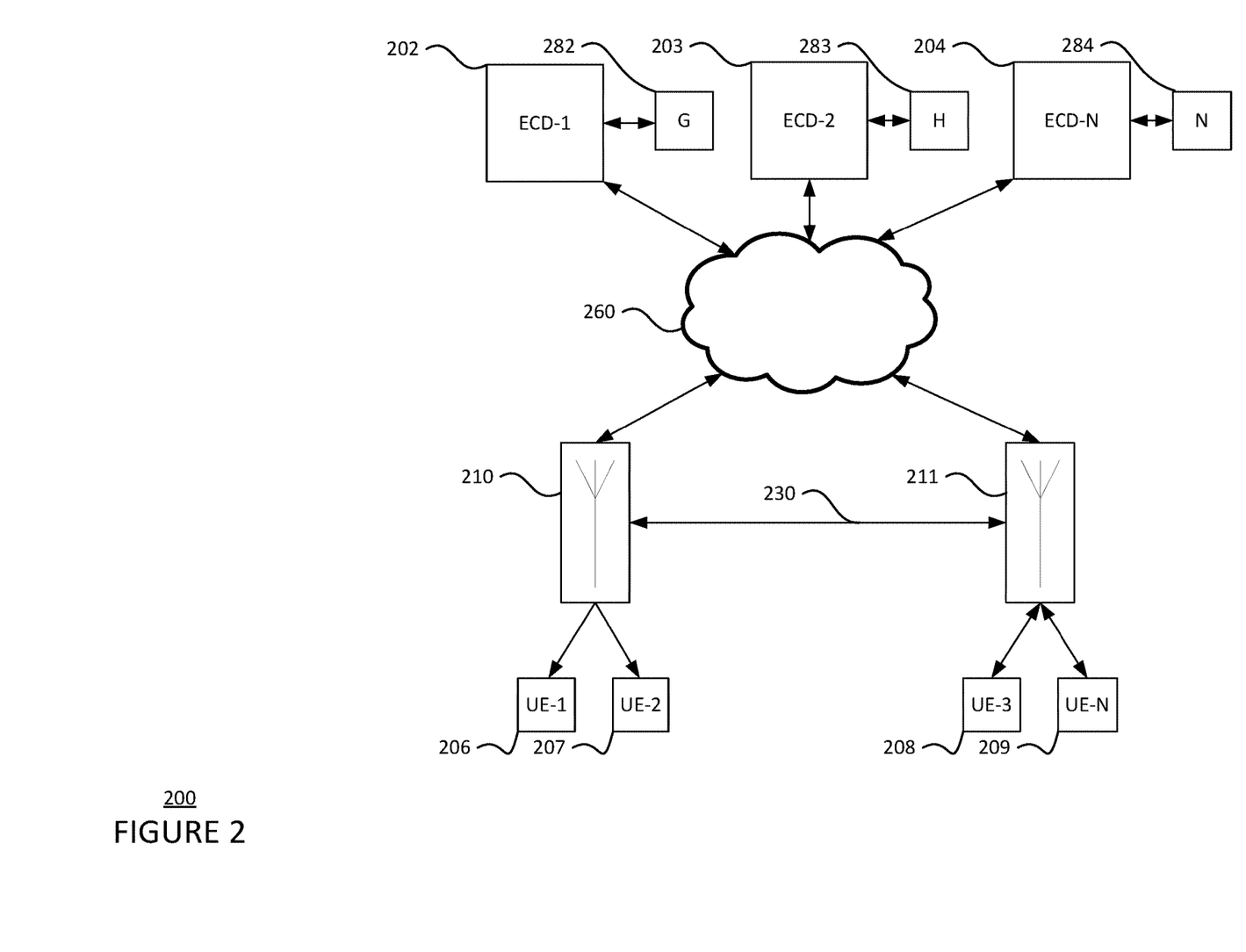
FIG. 2 shows an illustration of a non-coordinated shared spectrum system in accordance with aspects of the disclosure.
Figure 3:
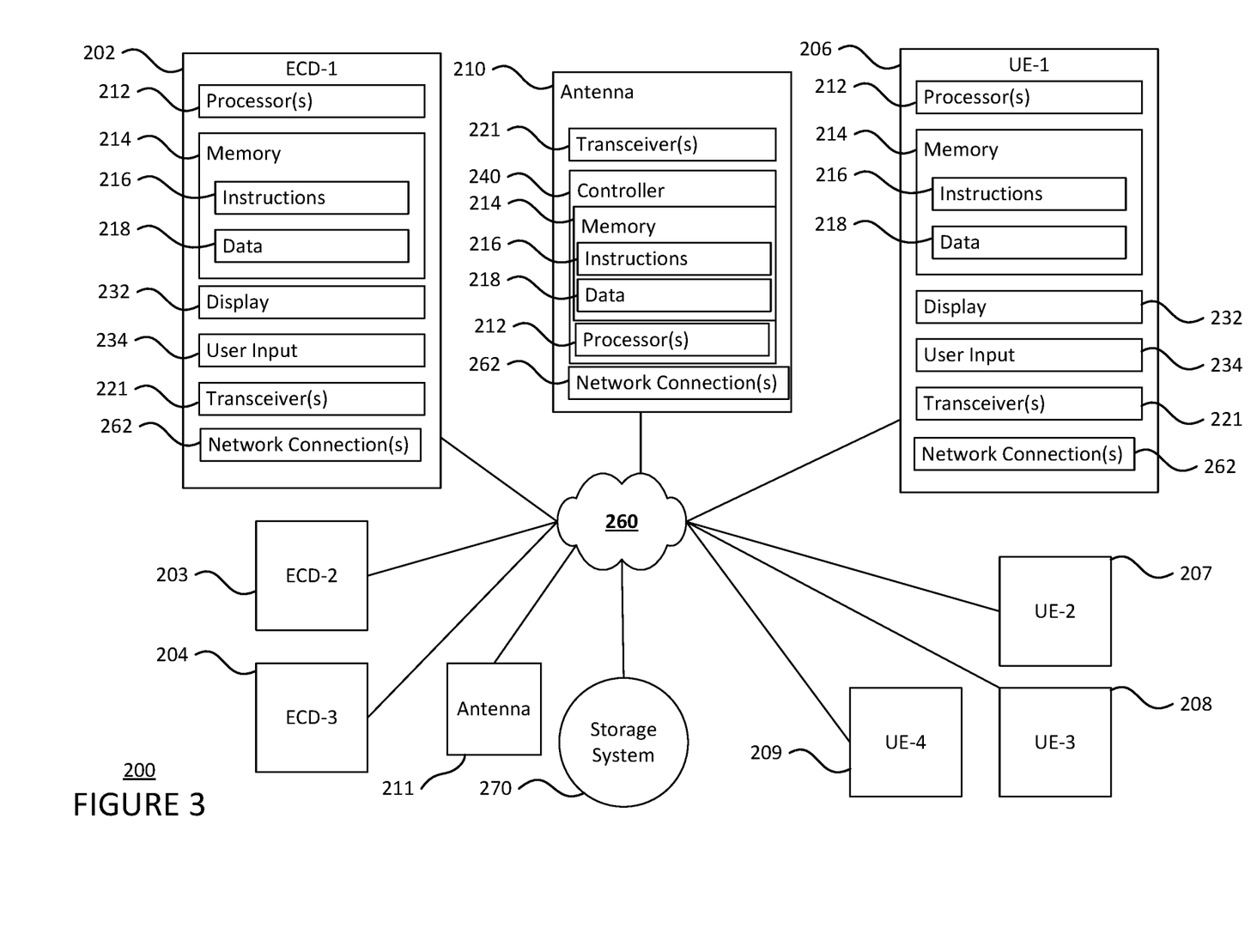
FIG. 3 shows and block diagram of the non-coordinated shared spectrum system view of the system from FIG. 2 in accordance with aspects of the disclosure.

FIGS. 2 and 3 depict an example wireless communication system 200 in which the features described herein may be implemented. This example should not be considered as limiting the scope of the disclosure or usefulness of the features described herein. The wireless communication system 200 may include one or more antennas 210, 211, one or more entity computing devices 202-204, and/or one or more user devices 206-209, as shown in wireless communication system 200 in FIGS. 2 and 3. The wireless communication system 200 may provide communication paths for the user devices through the antennas 210, 211 onto networks operated by one or more entities. The one or more entity computing devices 202-204 may be configured to control the assignment of frequencies to the user devices 206-209 by the antennas 210, 211.

Entity computing devices 202-204 may be any device configured to communicate with an antenna through a network or through direct wireless or wired communications channels outside of a network, such as a server, personal computer, laptop, tablet, etc. In this regard, entity computing devices 202-204 may include one or more processors 212, memory 214, a display such as display 232 (e.g., a monitor having a screen, a touch-screen, a projector, a television, or other device that is operable to display information), and user input device 234 (e.g., a mouse, keyboard, touch-screen or microphone). The entity computing devices 202-204 may be controlled by one or more entities. For instance, and as shown in FIG. 2, entity 'G' 282 may control entity computing device 202, entity 'H' 283 may control entity computing device 203, and entity 'N' 284 may control entity computing device 204. It should be understood that although FIG. 2 shows each entity computing device 202-204 as being controlled by one entity, each entity computing device 202-204 may be controlled by any entity and any combinations of entities.

It should also be understood that although entity computing devices 203 and 204, as illustrated in FIG. 3, are shown as empty boxes, entity computing devices 203 and 204 may include some or all of the components shown in entity computing device 202. Moreover, although FIGS. 2 and 3 show only entity computing devices 202-204, the wireless communication system 200 may include any number of antennas.

The processors 212 may be a commercially available central processing unit ("CPU"), a System on a Chip ("SOC"), an application specific integrated circuit ("ASIC"), a microprocessor, a digital signal processor (DSP), or other such hardware-based processors.

The entity computing devices 202-204 may also include one or more transceivers 221 and one or more network connections 262. The one or more transceivers may be configured to enable communication between the entity computing devices 202-204 and an antenna, such as antennas 210, 211 on particular frequency bands. The one or more network connections 262 may be configured to connect the entity computing devices 202-204 to a network, such as network 260, as further shown in FIG. 3.

Memory 214 of the entity computing devices 202-204 may store information accessible by processor 212, including instructions 216 that can be executed by the processor 212. The instructions 216 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Memory also includes data 218 that can be retrieved, manipulated or stored by the processor 212. The memory 214 can be of any non-transitory type capable of storing information accessible by the processor 212, such as a hard-drive, memory card, ROM, RAM, DVD, CD-ROM, write-capable, and read-only memories.

Data 218 can be retrieved, stored or modified by processor 212 in accordance with the instructions 216. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The antennas 210, 211 may include one or more transceivers 221 and one or more network connections 262. The one or more transceivers may receive and transmit data wirelessly between devices, such as the one or more entity computing devices 202-204, one or more user devices 206-209, and/or other antennas. The one or more network connections 262 may provide wireless or wired communication paths with other networks, such as network 260, and/or other devices, such as the one or more entity computing devices 202-204. In some instances, the antennas 210, 211 may be directly communicatively coupled with other antennas, as shown by double-sided arrow 230 in FIG. 2, and/or indirectly coupled with other antennas through a network, such as network 260 via the one or more network connections 262. Although FIGS. 2 and 3 show only two antennas 210, 211, the wireless communication system 200 may include any number of antennas. It should be understood that although antenna 211, as illustrated in FIG. 3, is shown as an empty box, antenna 211 may include some or all of the components shown in antenna 210.

Each antenna may include a controller for controlling the functions of the antenna, such as assigning user device channels and communication with entity computing devices 202-204 as described herein. The controller 240 may include one or more processors 212 and memory 214, as shown in FIG. 3. The one or more processors 212 and memory 214 may be compared to those described with regard to the entity computing devices 202-204, above. In some instances, controller 240 may include multiple processor types. For instance, controller 240 may include a microprocessor for performing channel assignments as well as another microprocessor for directing data traffic between other devices, such as user devices.

The user devices 206-209 may be any device which are configured to communicate over a wireless network via communication with an antenna, such as mobile phones, tablets, personal computers, servers, internet of things (IoT) devices, and other such devices. For instance, the user devices 206-209 may be smartphones that have all of the components normally used in connection with a personal computing device such as a processor 212, memory 214 (e.g., RAM and internal hard drives) storing data 218 and instructions 216, a display such as display 232 (e.g., a monitor having a screen, a touch-screen, a projector, a television, or other device that is operable to display information), and user input device 234 (e.g., a mouse, keyboard, touch-screen or microphone). It should be understood that although user devices 207-209 are illustrated in FIG. 3 as empty boxes, user devices 207-209 may include some or all of the components shown in user device 206.

Although FIG. 3 functionally illustrates the processor, memory, and other elements of the antenna 210, entity computing device 202, and user device 206 as being within the same block, the processor and/or memory can actually comprise multiple processors and/or memories that may or may not be stored within the same physical housing. For example, the memory can be a hard drive or other storage media located in housing different from that of entity computing device 202, user devices 206, and antenna 210. Accordingly, references to a processor or memory will be understood to include references to a collection of processors and/or memories that may or may not operate in parallel. For example, the entity computing device 202 may include server computing devices operating as a load-balanced server farm. Yet further, although some functions described below are indicated as taking place on a single entity computing device or user device having a single processor, various aspects of the subject matter described herein can be implemented by a plurality of computing devices, for example, communicating information over network 260.

As further shown in FIGS. 2 and 3, entity computing devices 202-204, user devices 206-209, and antennas 210, 211 can be at various nodes of a network 260 and capable of directly and indirectly communicating with other nodes of network 260. Although FIG. 2 shows only three entity computing devices 202-204 and four user devices 206-209, it should be appreciated that a wireless communication system 200 may include any number of entity computing devices and user devices.

The network 260 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As with memory 214, storage system 250 can be of any type of computerized storage capable of storing information accessible by entity computing devices, user devices, and/or antennas, such as a hard-drive, memory card, ROM, RAM, DVD, CD-ROM, write-capable, and read-only memories. In addition, storage system 270 may include a distributed storage system where data is stored on a plurality of different storage devices which may be physically located at the same or different geographic locations. Storage system 270 may be connected to the devices via the network 260 as shown in FIG. 3 and/or may be directly connected to or incorporated into any of the entity computing devices 202-204, antennas 210, 211, and/or user devices 206-209 (not shown). Storage system 270, as well as memory 214 may each store map data and/or data associated with notifications, such as requests for a new channel as detailed herein.

The user devices, entity computing devices, and antennas of the wireless communication system 200 may be configured to communicate over a spectrum of frequencies. In this regard, the radio spectrum generally used by wireless communication systems may cover the frequency range from 3 kHz to 300 GHz, although other frequency ranges may also be considered within the radio spectrum. Each wireless communication system may be further configured to operate within one or more frequency bands within the spectrum. The frequency bands used by a wireless communication system may be dependent upon the purpose of the wireless communication system, the technical characteristics of the wireless communication system, such as the distance the wireless communication system is configured to cover and the frequencies the wireless communication system is capable of using, licensing regulations which limit the frequencies available to particular wireless communication systems, etc. For example, the transceivers 221 of the antennas 210, 211 and user devices 206-209 of the wireless communication system 200 may be designed to operate as a 5G network having a frequency band between 3550 MHz and 3700 MHz, as shown in the frequency chart 400 of FIG. 4.

Figure 4:
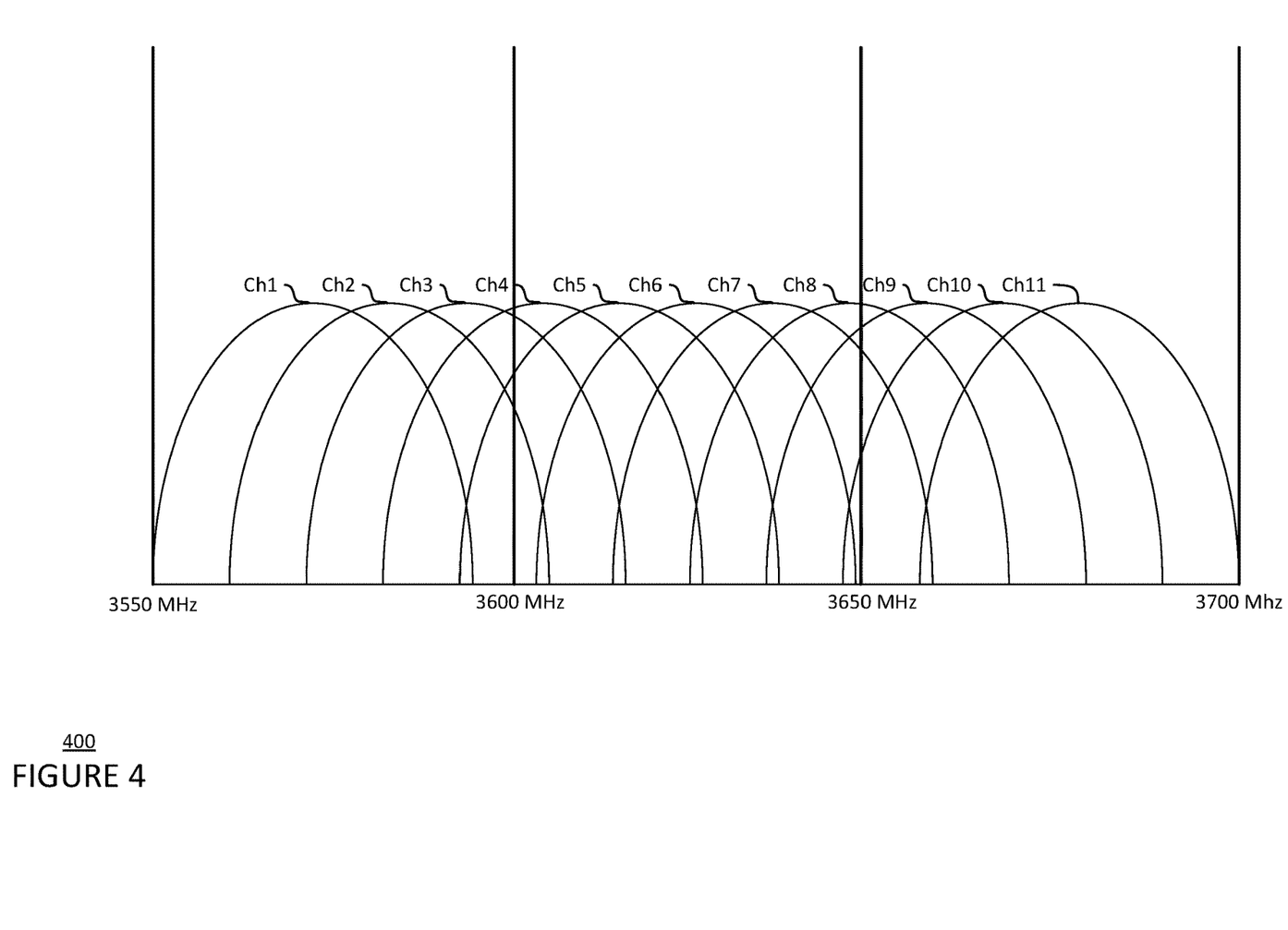
FIG. 4 shows channels allocated across a frequency band in accordance with aspects of the disclosure.

The frequency band may be split into channels that include a smaller frequency band within the frequency band. For example, the frequency band shown in the frequency chart 400 of FIG. 4 is split into 11 channels (Ch1-Ch11). Although the frequency band is shown as being split into 11 channels, any number of channels may be formed in the frequency band. The band of frequencies within each channel may overlap other channels. For instance, Ch1 overlaps Ch2-Ch5, as shown in FIG. 4. In some instances, the band of frequencies within each channel may have no overlap or only some channels may have some overlap.

Each antenna 210, 211 may provide devices access to networks operated by one or more entities. In this regard, the antennas 210, 211 may be controlled or otherwise managed by one or more third parties, such as authorized spectrum users. The third parties may provide entities, such as telecommunication companies, with access to frequency bands available on the antennas 210, 211. Entities may share frequency bands on the same antenna and/or each entity may control the entirety of a particular frequency band on an antenna. In some instances, different entities may be provided with the same frequency band on different antennas. For instance, a first entity may be provided with a frequency band on the first antenna 210 and a second entity may be provided with the same frequency band on the second antenna 211, as shown in FIG. 2. In some instances, an entity may manage its own antenna(s). For instance, the first entity may be an authorized spectrum user who controls first antenna 210 and allocates itself with a particular frequency band on the first antenna 210.

Each entity may control the allocation of channels by the antennas to the devices accessing their respective networks. In this regard, an entity computing device may communicate directly with an antenna and/or communicate with an antenna through a network. The entity computing device may instruct an antenna which channels to assign devices accessing its network. In some instances, the entity computing device may provide a listing of possible channels which the antenna may provide (or not provide) to devices and the antenna may assign channels to devices based on the list. The antenna may assign unused channels in a particular order or randomly. For instance, entity computing device 202 'ECD-1' may communicate with the first antenna 210 through network 260 as shown in FIG. 2. The entity computing device 202 'ECD-1' may provide a listing of channels, such as Ch1-Ch11 as shown in FIG. 4, to the first antenna 210. The listing of channels may be stored in the antenna's memory 214 and/or in a storage system 270. In some instances, an entity computing device may upload a listing of channels to a storage system and the antenna may query the storage system for relevant listings of channels.

Although the technology described herein is shown as being implemented on a non-coordinated shared spectrum system, the technology may be applicable to other systems including but not limited to uncoordinated radar systems, shared spectrum systems such as Wi-Fi or Citizens Broadband Radio Service (CBRS), and/or LIDAR systems.

Example Methods

As discussed above, it is preferable that devices in the same geographic area, including user devices 206-209 and entity computing devices 202-204, do not use the same channel of a frequency band at the same time to minimize interference between the devices. In a non-coordinated shared spectrum system interference between devices on different networks may occur before the interference can be minimized.

Figure 5:
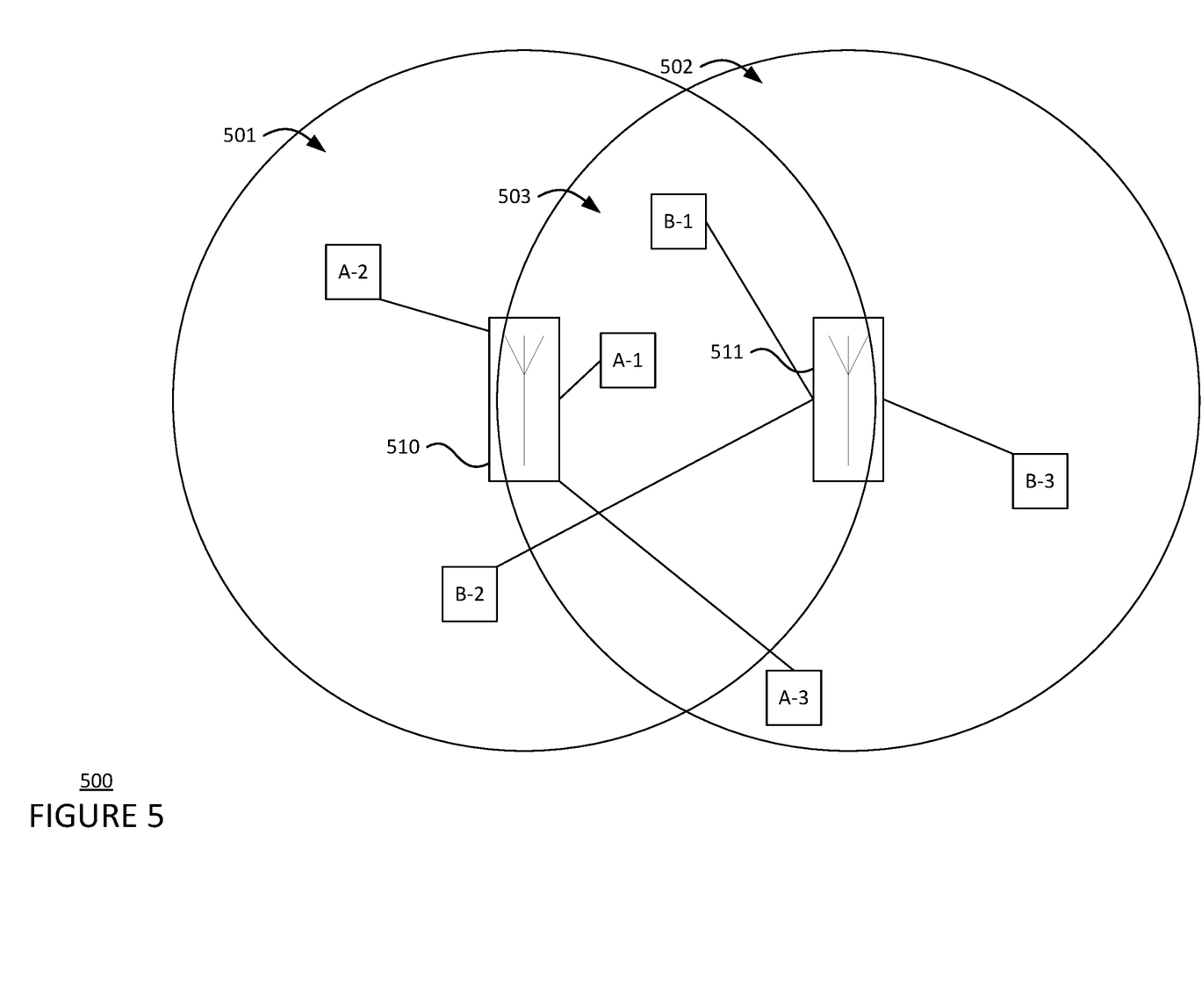
FIG. 5 shows an illustration of antennas having an overlapping coverage area in accordance with aspects of the disclosure.

For instance, as shown in FIG. 5, a non-coordinated shared spectrum system includes two antennas 510 and 511 which cover areas with the same frequency band. A third party may provide a first entity, such as entity T (not shown) with access to a frequency band on the first antenna 510 which covers the first area 501. Another third party may provide a second entity, such as entity T (not shown), with access to at least a portion of the same frequency band on the second antenna 511 having coverage over the second area 502. A portion of the first area 501 overlaps with a portion of the second area 502 at overlapping area 503. In the event entity T and entity T assign the same channel in the frequency band to devices, such as devices A-1 and B-1, interference may occur between device A-1's communication with the first antenna and/or device B-1's communication with the second antenna when either device (A-1 or B-1) is positioned in the overlapping area 503. Although only two antennas 501 and 502 are shown having overlapping coverage of the first area in FIG. 5, any number of antennas may provide overlapping coverage of an area. Additionally, there may be any number of geographic areas covered by antennas.

To minimize interference in a non-coordinated shared spectrum system, such as shown in FIG. 5, previous experiences of interference can be leveraged to minimize the risk of assigning channels which are likely to have interference. An example of this is outlined in flow chart 600 of FIG. 6. For example, when a device experiences interference caused by another device assigned the same channel or a channel having the same range of frequencies, the device may send a notification, such as a request for assignment of a new channel, to the antenna, as shown in block 601 of FIG. 6. For example, referring to FIG. 5, when the device A1 experiences interference caused by device B1, the device A1 may send a notification to antenna 510. In response, the antenna 510 may assign another available channel to the device A1. Although the examples described herein relate to reassigning channels, frequencies bands and portions of frequency bands may also be reassigned.

Figure 6:
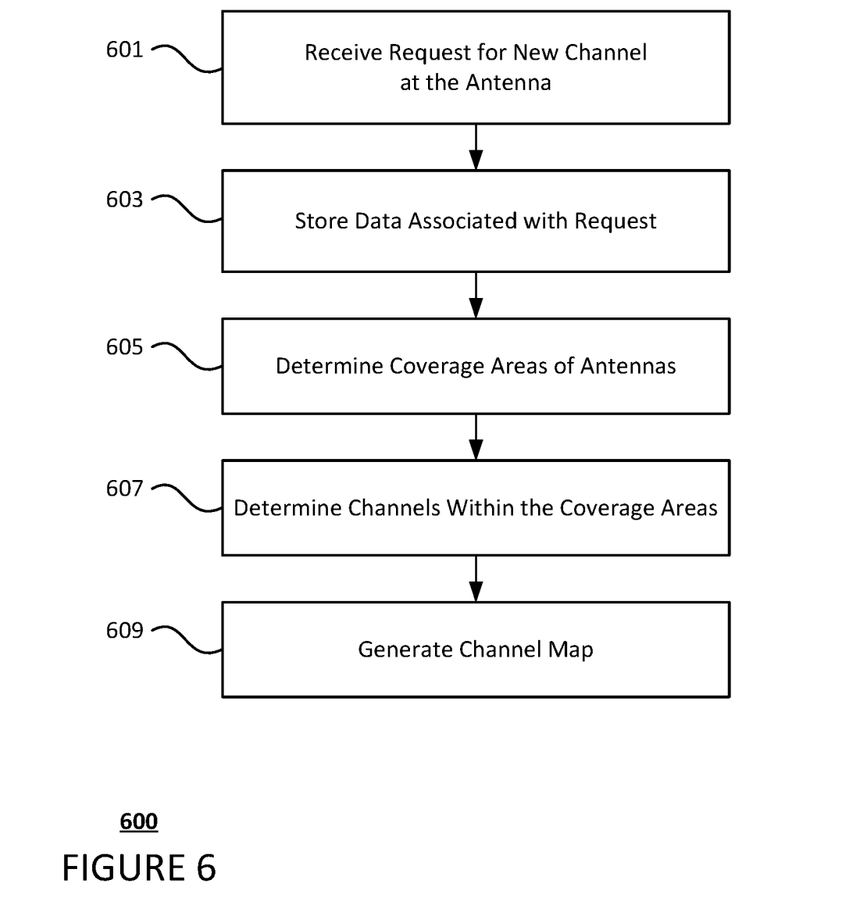
FIG. 6 is a flow chart in accordance with one aspect of the disclosure.

The receipt of the notification may cause the antenna to generate, request, transmit, and/or store data associated with the notification, as shown in block 603 of FIG. 6. In this regard, the data associated with the notification by the device A1 operating on entity 'I' network may be cataloged in a database, such as the database in the storage system 270. The database may store data associated with notifications received at some or all antennas on which entity 'I' operates its network. The data associated with the notification may include the channel on which the interference occurred, the time at which the interference occurred, the location of the device at the time of the interference, signal strength of the interference, the antenna's location, the type of device sending the notification, the type of spectrum use by the device sending the notification (e.g., LTE data use, Internet of Things use, etc.).

In some instances, after receiving the notification, some or all of the data may be forwarded from the antenna receiving the notification to the entity operating the network on which the device sending the notification is operating. In some instances, the antenna may pass the notification to the entity, such as to the entity's computing device 206, and some or all of the data may be directly retrieved by the entity from the antenna 510 and/or user device A1 that sent the notification. In other instances, some or all of the data may be forwarded directly from the user device A1 to the entity's computing device 206 or directly to the database.

In some instances, the database may further store data associated with notifications received at other antennas that the entity does not operate its network. The database may also include additional information, such as the locations of antennas not used by the entity, characteristics of the antennas, such as the transmission frequencies and transmission power of the antennas, the geographic coverage of antennas used and not used by the entity, the antenna manufacturer, the pattern of transmissions by the antennas, etc. This other information may be provided by publically available sources and/or through partnership agreements with other entities or third parties.

Figure 7:
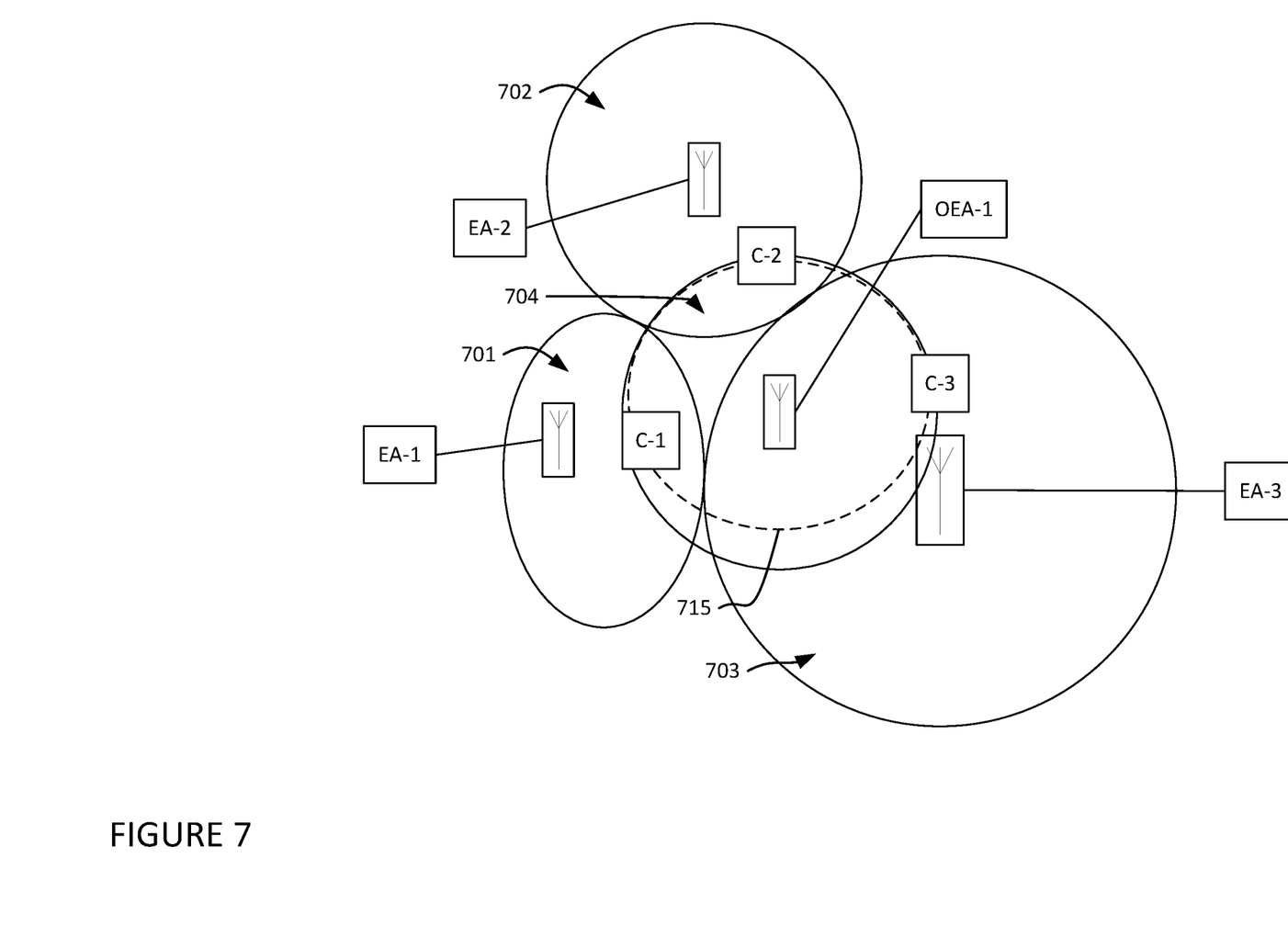
FIG. 7 shows an illustration of estimating an antenna's coverage area in accordance with aspects of the disclosure.

In some instances, other information may be generated based on the data and additional data received from the antennas, entity computing devices, and/or user devices. For example, and as shown in block 605 of FIG. 6, the coverage area of antennas may be determined. For instance, and as shown in FIG. 7, devices C1-C3 on a network operated by an entity and served by antennas EA-1-EA-3 having coverage areas 701-703, respectively, may request new channels. When the devices C1-C3 requests new channels within the coverage area 704 of an antenna OEA-1 that serves another network, the request may provide insight into the coverage area 704 of antenna OEA-1, as well as the channels used by antenna OEA-1. For instance, based upon the locations of the devices C1-C3 at the times of requests for a new channel (shown in FIG. 7), the coverage area 704 of antenna OEA-1 may be at least roughly determined. In this regard, an area which is likely covered by antenna OEA-1 may be defined by connecting the locations of devices C1-C3 together— illustrated by line 715. Connecting the locations together may include drawing straight or curved lines between the locations of the devices at the times of notifications, such as the requests for a new channel. Connecting the locations together may additionally or alternatively include overlaying and fitting a shape, such as a circle, oval, etc., onto the locations. The accuracy of a determination of a coverage area of an antenna may be improved by including more locations of requests around an antenna. Moreover, the rough determination of the coverage area of 704 may be refined based upon other data, such as the radiation pattern of antenna OEA-1, the power of antenna OEA-1, etc. In some instances, the rough determination of the coverage area of 704 may be based upon other data, such as the radiation pattern and power of antenna OEA-1 and the data associated with the request may be used to refine the rough determination of the coverage area.

Figure 8:
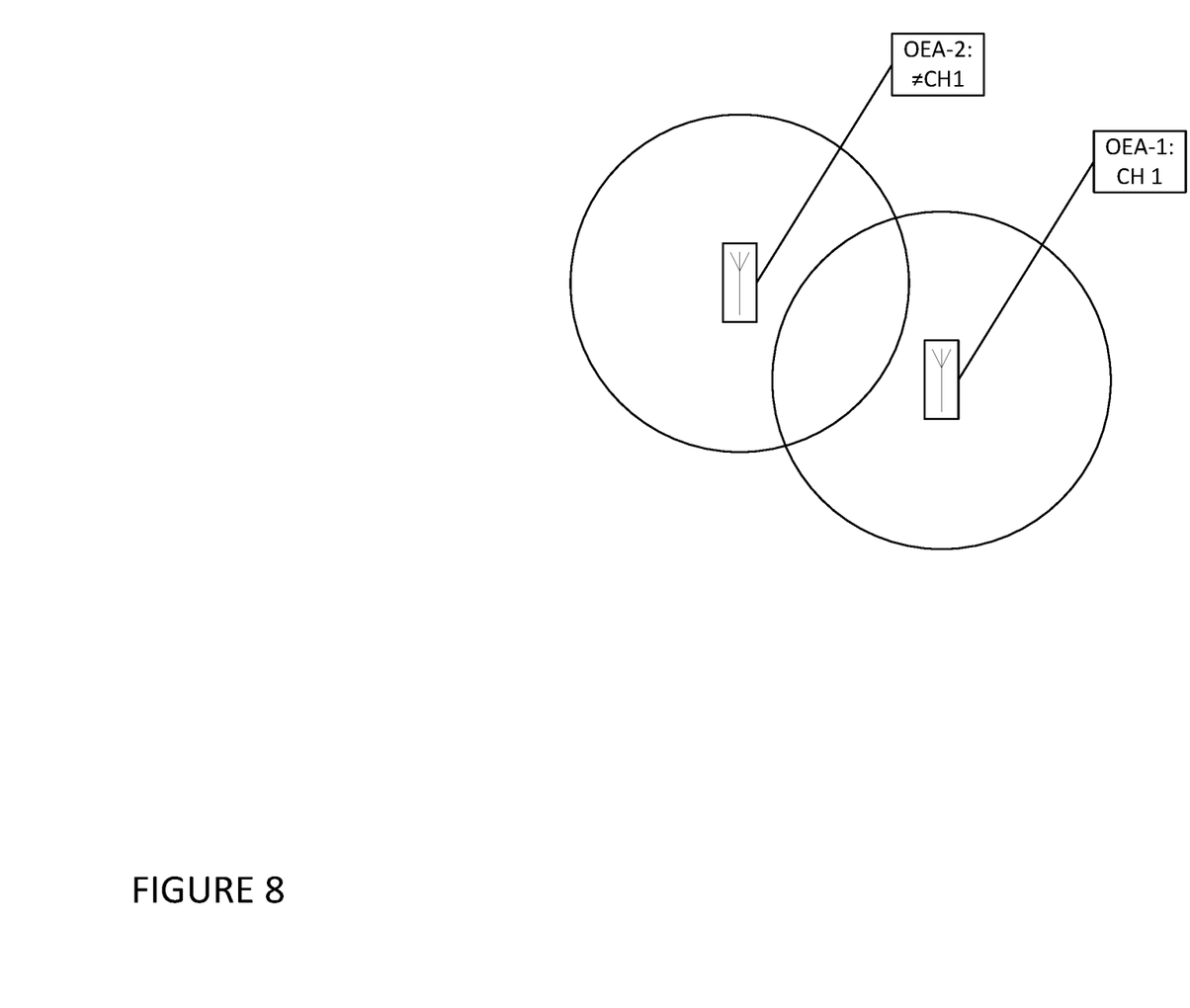
FIG. 8 shows an illustration of predicted channel assignments in accordance with aspects of the disclosure.

In another example, other information may be generated based on the assumption that antennas which are serving the same network would not interfere. In this regard, overlapping areas of coverage between two or more antennas serving the same network are likely not serving the same channels or frequencies. For instance, and as shown in FIG. 8, if it is determined OEA-1 is serving channel 1 and OEA-1 covers common areas with OEA-2, it can be assumed that OEA-2 likely does not serve channel 1 or frequencies which would interfere with channel 1.

Based on the data and/or other information in the database, the channels available and/or unavailable within a coverage area of the antennas may be determined as shown in block 607 of FIG. 6. In this regard, available channels may be channels that can be assigned by an antenna. Channels that can be assigned by the antenna may include channels for which a request for change from a device has not yet occurred and/or channels which have not yet been assigned. Unavailable channels may be those channels which a device previously requested to change off of due to interference. For example, if a device experiences interference on a particular channel and sends a notification, that particular channel may be categorized as unavailable. In some instances, an unavailable channel may be made temporarily available to determine if interference is still present on that channel. In this regard, the temporarily available channel may be assigned to another user device. The temporarily available channel may be considered permanently available if the user device does not experience interference. Otherwise, the temporarily available channel may be again categorized as unavailable.

Available channels may be found by determining from the data and/or other information a list of possible channels at an antenna. Each channel for which a notification is received may be removed from the list of possible channels. All remaining channels on the list of possible channels may be considered available channels.

A map of the antennas with their respective available and/or unavailable channels can be generated, as shown in block 609 of FIG. 6. The map may provide a visual representation of antenna locations and the channels which are known or otherwise determined to be unavailable or available at each antenna. In some instances, the map may be a collection of data which includes data that can be used to generate a visual representation of antenna locations and the channels which are known or otherwise determined to be unavailable or available at each antenna. For instance, the collection of data may include the latitude and longitudes of the antenna locations, boundaries of the antenna's range, a list of available and/or unavailable channels for each antenna on which the entity operates its network, etc. The map may also provide the locations and coverage areas of some or all known antennas, as well as visual or listed details corresponding to the data and/or other information. The list of available and/or unavailable channels in the map may be used in place of the listing of available channels provided by an entity or in combination with the list.

Figure 9:
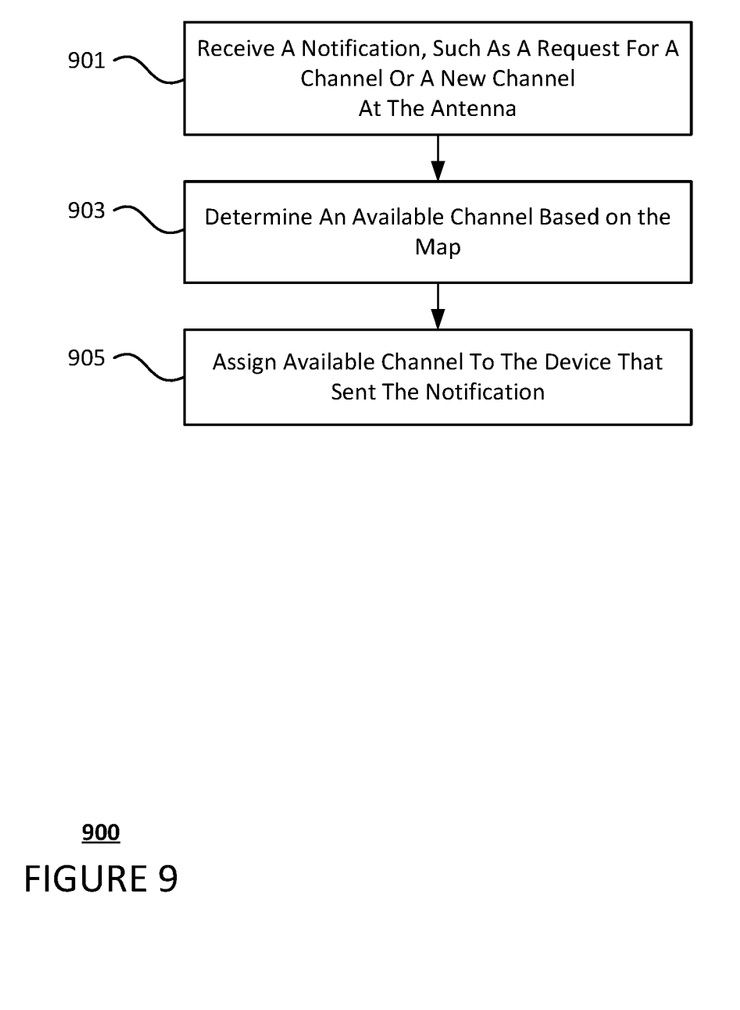
FIG. 9 is a flow chart in accordance with one aspect of the disclosure.

The assignment of channels by the antennas to the user devices, such as user devices 206-209, in the wireless communication system operated by entity, such as entity 'G', can be performed based on the available and/or unavailable channels as found in the map provided by the entity computing devices 202-204, as shown in flow chart 900 in FIG. 9.

As shown in block 901, a notification, such as a request for a channel or new channel is received by an antenna. In response, the antenna may determine an available channel, as shown in block 903. For example, the antenna may review the available channels on its list and/or in the map provided by the entity computing device for an available channel. In other examples, the entity computing device may determine the available channel in block 903. For example, the antenna may request the entity computing device to identify an available channel to assign. The entity computing device may communicate the available channel to the antenna, and the available channel may then be assigned to the device by the antenna, as shown in block 905.

In some instances, such as when the interference is determined to have low strength or occur intermittently, the antenna may instruct the user device to generate a stronger signal to effectively overpower the interfering signal. In this regard the assignment of a new channel may be denied.

The features described above, may allow devices operating on a non-coordinated shared spectrum system to be assigned channels with a low risk of interference. As a result, channel reassignment requests may be reduced and better service for the devices may be provided. Moreover, the need for coordination between entities may be avoided which may reduce operational expenses and the need for active management.

Although the disclosure herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for use in a non-coordinated shared spectrum system, the method comprising:
receiving, by one or more processors, data associated with a notification from a device experiencing interference on an assigned channel;
determining, by the one or more processors, a coverage area of an antenna providing the assigned channel to the device;
determining, by the one or more processors, based on the data associated with the notification, available channels within the coverage area of the antenna; and
generating, by the one or more processors, a map based on the data associated with the notification, wherein the map indicates the available channels within the coverage area of the antenna.

2. The method of claim 1, wherein the notification includes a request for a new channel assignment, and the method further comprises:
assigning one of the available channels to the device in response to the request.

3. The method of claim 1, wherein the data associated with the notification includes one or more of:
the channel,
a time at which the interference occurred,
a location of the device at the time at which the interference occurred,
a signal strength of the interference,
a location of the antenna, or
a type of the device.

4. The method of claim 3, further comprising determining the coverage area of another antenna by:
defining an area around the other antenna based on the location of the device at the time at which the interference occurred and a set of other locations of devices, wherein the other locations are locations of the devices at the time the other devices experienced interference.

5. The method of claim 3, wherein determining the available channels includes:
determining a set of possible channels available at the antenna;
determining all unavailable channels in the set of possible channels; and
removing the unavailable channels from the set of possible channels.

6. The method of claim 5, wherein the unavailable channels are one or more channels on which the device or another device experienced interference.

7. The method of claim 1, wherein the map provides a visual representation of antenna locations corresponding to the antenna and at least one other antenna, and the available channels at each of the antennas.

8. The method of claim 7, wherein the map further provides a visual representation of coverage areas at the antenna and the at least one other antenna.

9. The method of claim 1, wherein the interference is caused by another device communicating on the assigned channel with another antenna.

10. A system for use in a non-coordinated shared spectrum system comprising:
one or more processors, wherein the one or more processors are configured to:
receive data associated with a notification from a device experiencing interference on an assigned channel;
determine a coverage area of an antenna providing the assigned channel to the device;
determine based on the data associated with the notification, available channels within the coverage area of the antenna; and
generate a map based on the data associated with the notification, wherein the map indicates the available channels within the coverage area of the antenna.

11. The system of claim 10, wherein the notification includes a request for a new channel assignment, and the one or more processors are further configured to:
assign one of the available channels to the device in response to the request.

12. The system of claim 10, wherein the data associated with the notification includes one or more of:
the channel,
a time at which the interference occurred,
a location of the device at the time at which the interference occurred,
a signal strength of the interference,
a location of the antenna, or
a type of the device.

13. The system of claim 12, wherein the one or more processors are further configured to determine the coverage area of another antenna by:
defining an area around the other antenna based on the location of the device at the time at which the interference occurred and a set of other locations of devices, wherein the other locations are locations of the devices at the time the other devices experienced interference.

14. The system of claim 12, wherein determining the available channels includes:
determining a set of possible channels available at the antenna;
determining all unavailable channels in the set of possible channels; and
removing the unavailable channels from the set of possible channels.

15. The system of claim 14, wherein the unavailable channels are one or more channels on which the device or another device experienced interference.

16. The system of claim 10, wherein the map provides a visual representation of antenna locations corresponding to the antenna and at least one other antenna, and the available channels at each of the antennas.

17. The system of claim 10, wherein the map includes a collection of data which lists antenna locations corresponding to the antenna and at least one other antenna, and the available channels at each of the antennas.

18. A non-transitory computer-readable medium storing instructions, which when executed by one or more processors, cause the one or more processors to:
receive data associated with a notification from a device experiencing interference on an assigned channel;
determine a coverage area of an antenna providing the assigned channel to the device;

determine based on the data associated with the notification, available channels within the coverage area of the antenna; and generate a map based on the data associated with the notification, wherein the map indicates the available channels within the coverage area of the antenna.

19. The non-transitory computer readable medium of claim 18, wherein the notification includes a request for a new channel assignment and the instructions further cause the one or more processors to:

assign one of the available channels to the device in response to the notification.

20. The non-transitory computer readable medium of claim 18, wherein the data associated with the notification includes one or more of:

the channel,
a time at which the interference occurred,
a location of the device at the time at which the interference occurred,
a signal strength of the interference,
a location of the antenna, or
a type of the device.

\* \* \* \* \*